(12) United States Patent
Sun et al.

(10) Patent No.: US 10,540,193 B2
(45) Date of Patent: Jan. 21, 2020

(54) SOFTWARE-DEFINED MICROSERVICES

(71) Applicant: INTEL CORPORATION, Santa Clara, CA (US)

(72) Inventors: Mingqiu Sun, Beaverton, OR (US); Noah Zentzis, Portland, OR (US); Vincent J. Zimmer, Federal Way, WA (US); Peggy J. Irelan, Chandler, AZ (US); Timothy E. Abels, Beaverton, OR (US); Gopinatth Selvaraje, Portland, OR (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 241 days.

(21) Appl. No.: 15/590,781

(22) Filed: May 9, 2017

(65) Prior Publication Data

US 2018/0329729 A1    Nov. 15, 2018

(51) Int. Cl.
*G06F 9/455* (2018.01)
*G06F 16/28* (2019.01)
*G06F 12/14* (2006.01)

(52) U.S. Cl.
CPC ........ *G06F 9/45504* (2013.01); *G06F 12/145* (2013.01); *G06F 12/1475* (2013.01); *G06F 16/289* (2019.01); *G06F 2009/45579* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 2010/0281273 A1* | 11/2010 | Lee | .......................... | G06F 21/72 |
| | | | | 713/190 |
| 2017/0364685 A1* | 12/2017 | Shah | ........................ | G06F 21/53 |
| 2018/0165088 A1* | 6/2018 | Bonar | ........................ | G06F 8/65 |

* cited by examiner

*Primary Examiner* — Diem K Cao
(74) *Attorney, Agent, or Firm* — Finch & Maloney PLLC

(57) ABSTRACT

A microservice infrastructure that securely maintains the currency of computing platform microservices implemented within a process virtual machine is provided. The computing platform microservices maintained by the infrastructure may include protected methods that provide and control access to components of the underlying computing environment. These components may include, for example, storage devices, peripherals, and network interfaces. By providing a software-defined microservice layer between these hardware components and workflows that specify high-level application logic, the embodiments disclosed herein have enhanced flexibility and scalability when compared to conventional technology.

22 Claims, 6 Drawing Sheets

SOFTWARE-DEFINED MICROSERVICES

BACKGROUND

A microservice is software component that executes highly cohesive application logic and that exposes well-defined interfaces through which other system components can interoperate with the microservice. By virtue of these traits, microservices are generally coupled loosely to other system components and can be changed and deployed independently from them. However, microservices are generally not coupled loosely to the computing environment in which they execute. Rather, microservices are compiled and linked to execute within specific computing environments and under the control of specific operating systems.

DETAILED DESCRIPTION

Figure 1:
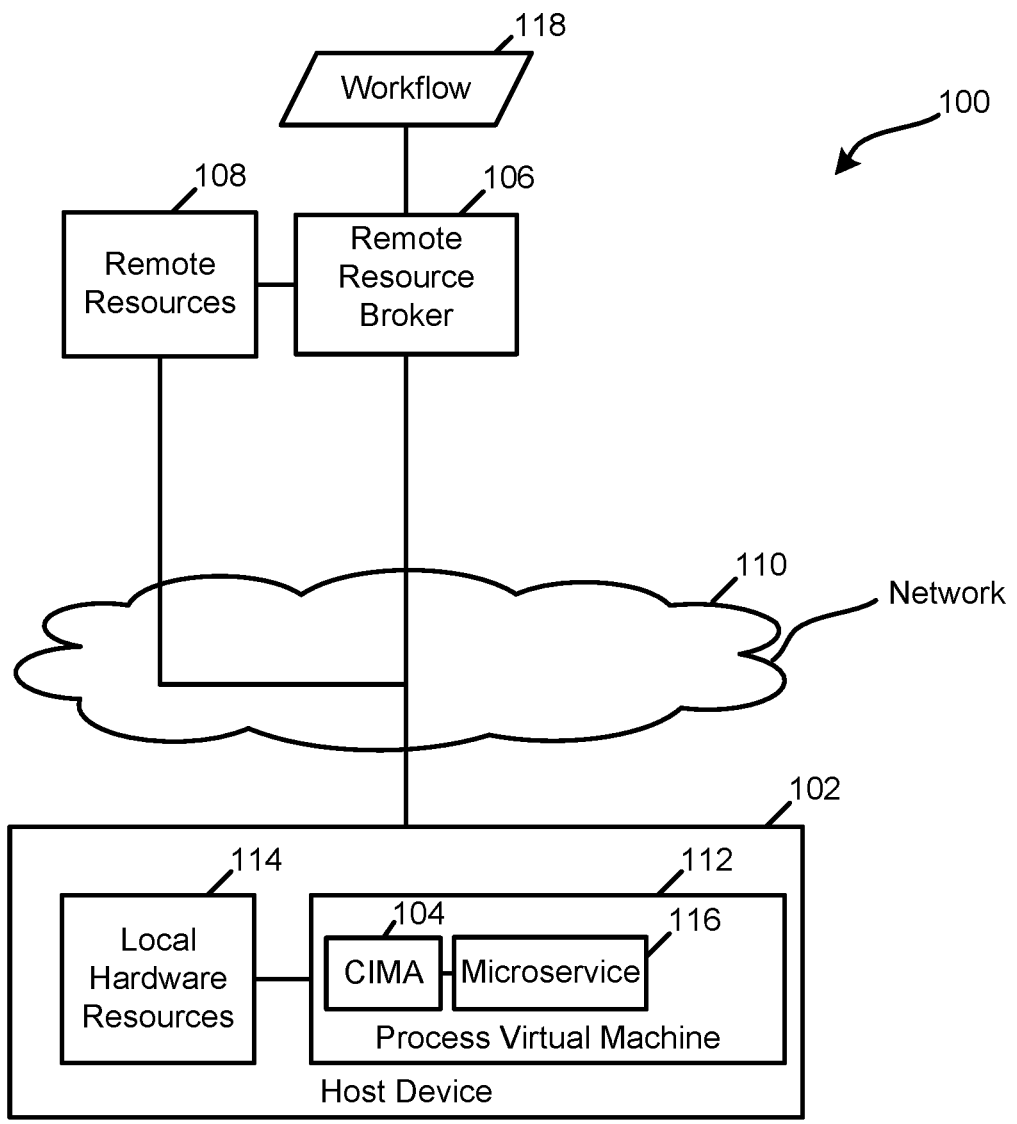
FIG. 1 is a block diagram illustrating a computing system implementing a microservice infrastructure configured in accordance with an embodiment of the present disclosure.

A microservice infrastructure as disclosed herein securely maintains currency of one or more computing platform microservices implemented within a process virtual machine. In some embodiments, this infrastructure includes source code that defines properties and methods of the computing platform microservices, compilers that process the source code to generate intermediate code to be executed by the process virtual machine, and trusted endpoints that securely deploy microservices and methods to the process virtual machine. In some embodiments, the computing platform microservices maintained by this infrastructure may provide and control access to components of an underlying computing environment. These components may include, for example, system input/output devices, storage devices, peripherals, and network interfaces. Moreover, these components may be local to a computing device implementing the process virtual machine and/or may be distinct and remote from it.

The fundamental nature of the platform computing services provided by these microservices and the methods they access warrants substantial security measures. Thus, in some embodiments, the process virtual machine allocates a controlled immutable method area (CIMA) and stores methods used to access the underlying computing environment in this CIMA. Such methods may be referred to herein as CIMA methods. In some embodiments, the process virtual machine protects intermediate code (e.g., the CIMA methods) stored in the CIMA from manipulation by programs (e.g., microservices that call CIMA methods) running within the process virtual machine or elsewhere.

Additionally, to maintain security in deployment of individual microservices and CIMA methods, in some embodiments the process virtual machine receives security challenges from a trusted endpoint and responds to the security challenges prior to executing any deployment activity. In these embodiments, the trusted endpoint may be local to a computing device implementing the process virtual machine or may be distinct and remote from it. In either case, responses generated and transmitted by the process virtual machine to the trusted endpoint may include attestation data. Attestation data is descriptive of the constitution of one or more components of the process virtual machine and, therefore, can be used to measure the integrity of the process virtual machine. For instance, where one of the components examined to generate the attestation data has been altered (e.g., via malware), the attestation data will indicate a change in the component. Thus the trusted endpoint, in processing a response from the process virtual machine, can determine whether components of the process virtual machine are in an expected, predefined state. Where this is the case, the trusted endpoint transmits a positive acknowledgement to the process virtual machine, thereby establishing a trusted communication session with the process virtual machine. Where the trusted endpoint determines that one or more components of the process virtual machine are not in a predefined state, the trusted endpoint will not transmit a positive acknowledgment, thereby signaling a lack of trust to the process virtual machine. How a process virtual machine reacts to a lack of trust can vary, but such reactions may include termination of the process virtual machine.

In some embodiments, where a trusted communication session is established between the process virtual machine and the trusted endpoint, the trusted endpoint may, as desired, transmit one or more requests to update a microservice and/or a CIMA method to the process virtual machine. These requests may include, for example, an updated CIMA method and a request to load the updated CIMA method. In response to receiving such a request, the process virtual machine parses the request and validates whether the request was received within a trusted communication session. If so, the process virtual machine deploys the update included in the request to the CIMA. Where the request was not received within a trusted communication session, the process virtual machine aborts deployment of the update.

In some embodiments, a compiler receives source code and generates intermediate code for execution by the process virtual machine. In these embodiments, the compiler is configured to scan the source code for one or more language constructs that indicate protected methods (e.g., CIMA methods) called by or included in a software-defined microservice. Further, in these embodiments, where the compiler finds such a language construct, the compiler generates intermediate code that defines the protected methods and stores that intermediate code at a storage location available to the process virtual machine. Consequently, when the process virtual machine is executed, part of the initialization process of the process virtual machine is to load the newly complied protected methods into the CIMA within the process virtual machine.

In some embodiments, the software-defined computing platform microservices described herein are provisioned and orchestrated by a local or cloud-based resource broker as part of an overall workflow. Within these workflows, the computing platform microservices may communicate with other resources to accomplish an overall computing objective. For example, the software-defined computing platform microservices may be part of a peer to peer system in which local resource brokers interoperate to identify and elect a leader node for the overall computing objective. By providing a software-defined microservice layer between the orchestrated workflow and local or remote hardware resources, the embodiments disclosed herein have enhanced flexibility and scalability when compared to conventional technology.

Moreover, in some embodiments, the CIMA methods expose interfaces to the underlying computing environment that are called by computing platform microservices or other microservices. For instance, the CIMA methods may be part of a class library that is, at least in part, loaded to the CIMA, and configured and/or controlled by a trusted cloud-based console. In this way, the embodiments disclosed herein enable a software-driven view of the underlying computing environment at a fine-grain method level.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

Computer implemented systems consisting of tightly coupled components are generally fragile and not easily modified. While some advances have emerged to enable more loosely coupled systems, tight coupling between system components remains a troublesome issue in some areas. For instance, although many conventional managed runtime systems support dynamic application update, system interfaces such as system input/output, network, storage, and peripheral are part of a hardcoded system layer that is not changeable via a programming interface. There are many good reasons for this approach, with security as a top concern, but this approach also prevents systems from having flexibility regarding how these system layer services are provided. While virtualization techniques can help with this issue, some conventional virtualization techniques can present a service granularity challenge. For example, although system or operating system virtual machines are good tools for workload level orchestration (install-start-stop-resume), a process virtual machine is best-suited for a fine-grained orchestration at the application method level.

Thus, an in accordance with at least some embodiments disclosed herein, a microservice infrastructure is provided in which virtualized system interfaces are implemented as methods and/or microservices within a process virtual machine, such as the Java® virtual machine. In some embodiments, the microservice infrastructure includes, at least, a trusted endpoint and a host device. The microservice infrastructure provides a secure mechanism for maintaining (e.g., upgrading or otherwise modifying) microservices and/or methods. These microservices and/or methods form a software based, virtualized computing platform that may be modified and executed securely.

System Architecture

FIG. 1 illustrates a distributed computing system 100 implementing a microservice infrastructure in accordance with at least one embodiment. As shown, the computing system 100 includes a host device 102, a remote resource broker 106, remote resources 108, a workflow 118, and a communication network 110. The host device 102 includes a local hardware resources 114, which are described further below with reference to FIG. 6, and a process virtual machine 112. The local hardware resources 114 can include, for example, one or more network interfaces (e.g., network interface cards), data storage devices (e.g., persistent or volatile memory), and peripherals (e.g., displays, printers, speakers, and the like). As shown, the process virtual machine 112 implements and/or controls a CIMA 104 and a microservice 116.

The communication network 110 illustrated in FIG. 1 can include any of a variety of networks through which computing devices can exchange (e.g., transmit or receive) data. Examples of such networks include wide area networks, local area networks, cellular networks, plain telephone networks, and the like. While the data exchanged via the network 110 can be encoded according to a variety of standards including, for example, transmission control protocol/internet protocol (TCP/IP), the embodiments disclosed herein are not limited to a particular network standard or set of standards.

In some embodiments illustrated by FIG. 1, the host device 102, the remote resource broker 106, and the remote resources 108 are each implemented using one or more computing devices, such as the computing device described further below with reference to FIG. 6. In these embodiments, the host device 102, the remote resource broker 106, and the remote resources 108 are each configured to exchange information via the network 110.

In some embodiments, the remote resource broker 106 is configured to provision and orchestrate the workflow 118.

When executing according to this configuration, the remote resource broker 106 may provision and orchestrate the remote resources 108 and/or the microservice 116 implemented by the host device 102. The remote resources 108 provisioned and orchestrated in this manner may include a variety of real and/or virtual computing resources residing at various levels of abstraction from the underlying computing hardware. For example, the remote resources 108 may include data storage devices, such as memory; compute resources, such as processors; network resources, such as routers; and the like. Additionally or alternatively, the remote resources 108 may include real and/or virtual servers, such as application servers, database servers, and the like. These real and/or virtual servers may be organized into grids or clusters that collaboratively implement the workflow 118. Examples of a commercially available remote resource brokers that may be used to implement the remote resource broker 106 and to orchestrate the workflow 118 include Amazon Web Services, Microsoft Azure, Google Compute Engine, and IBM Softlayer.

In some embodiments, the remote resource broker 106 is also a trusted endpoint and, as such, is configured to maintain currency of methods and microservices resident on various other computing devices, such as methods stored in the CIMA 104 and/or the microservice 116 resident on the host device 102. When executing according to this configuration in some embodiments, the remote resource broker 106 maintains the currency of the methods stored in the CIMA 104 and/or the microservice 116 by deploying, within a trusted communication session, updated versions of one or more methods to the CIMA 104 and/or an updated version of the microservice 116 to the host device 102. These updated versions may include one or more classes comprising various properties and methods. The methods may include both conventionally stored methods and CIMA methods.

In some embodiments, to establish and maintain the trusted communication session with the host device 102, the remote resource broker 106 periodically and/or aperiodically transmits one or more challenges to and receives one or more responses from the process virtual machine 112 resident on the host device 102. The one or more responses can include attestation data generated by the process virtual machine 112. In some embodiments, this attestation data is descriptive of the constitution of various components of the host device 102. In these embodiments, the remote resource broker 106 processes the one or more responses, along with any included attestation data, to ensure that one or more components of the host device 102 have not be replaced, altered, or otherwise compromised (e.g., by malware). For example, in some embodiments, the remote resource broker 106 performs a bitwise comparison of attestation data to reference data locally generated by the remote resource broker 106 from a copy of the components recorded as being most recently deployed to the host device 102. Where the bitwise comparison indicates a match (i.e, where the attestation data matches the reference data), the remote resource broker 106 is able to verify the integrity of the host device 102 and, therefore, continue to interoperate safely with it.

In some embodiments, the process virtual machine 112 is a hardware and/or a software component that provides a hardware and/or operating system independent computing platform for execution of application logic. This application logic can take the form of a software program encoded in, for example, intermediate code supported by the process virtual machine 112. In some embodiments, the process virtual machine 112 and its components are configured to protect and render immutable all intermediate code stored in the CIMA 104, except where a trusted endpoint requests changes to the intermediate code within a trusted communication session. For instance, in one of these embodiments, the process virtual machine 112 stores information descriptive of the memory addresses located within the CIMA 104 and aborts execution of any instruction to write to the stored memory addresses that is not transmitted by a trusted endpoint within a trusted communication session. Examples of process virtual machines that may be used to implement the process virtual machine 112 include the Java Virtual Machine, Microsoft .Net framework, and the like. Furthermore, the process virtual machine described herein may be implemented in hardware under control of a processor (e.g., the processor 604 described below with reference to FIG. 6) or in software executed by such a processor.

In some embodiments, the microservice 116 is a program executable by the process virtual machine 112 to provide other programs executable by the process virtual machine 112 with one or more hardware and/or operating system independent computing platform services. Examples of the computing platform services that the microservice 116 may be configured to provide include network, storage, and/or peripheral services. For example, in one embodiment, the microservice 116 is configured to receive and process requests to transmit information via a virtualized network interface card. In another embodiment, the microservice 116 is configured to receive and process requests to store data in a virtualized data storage device. In another embodiment, the microservice 116 is configured to receive and process requests to display information on a virtualized display. Thus, in these embodiments, the microservice 116 is configured to implement a computing platform service by exposing a system interface to a virtualized computing platform component, receiving requests to use the virtualized computing platform component via the system interface, and processing these use requests. In processing the use requests, the microservice 116 may access and utilize the local hardware resources 114 (e.g., via the process virtual machine 112), transmit requests to the remote resource broker 106 to provision and/or utilize the remote resources 108, and/or transmit requests to the remote resources 108 to access and use previously provisioned remote resources. Additionally or alternatively, in processing use requests, the microservice 116 may call CIMA methods stored in the CIMA 104 that control and provide access to component of the underlying computing environment. Particular examples of the processes executed by some embodiments of the microservice 116 are described further below with reference to FIGS. 4 and 5.

Figure 2:
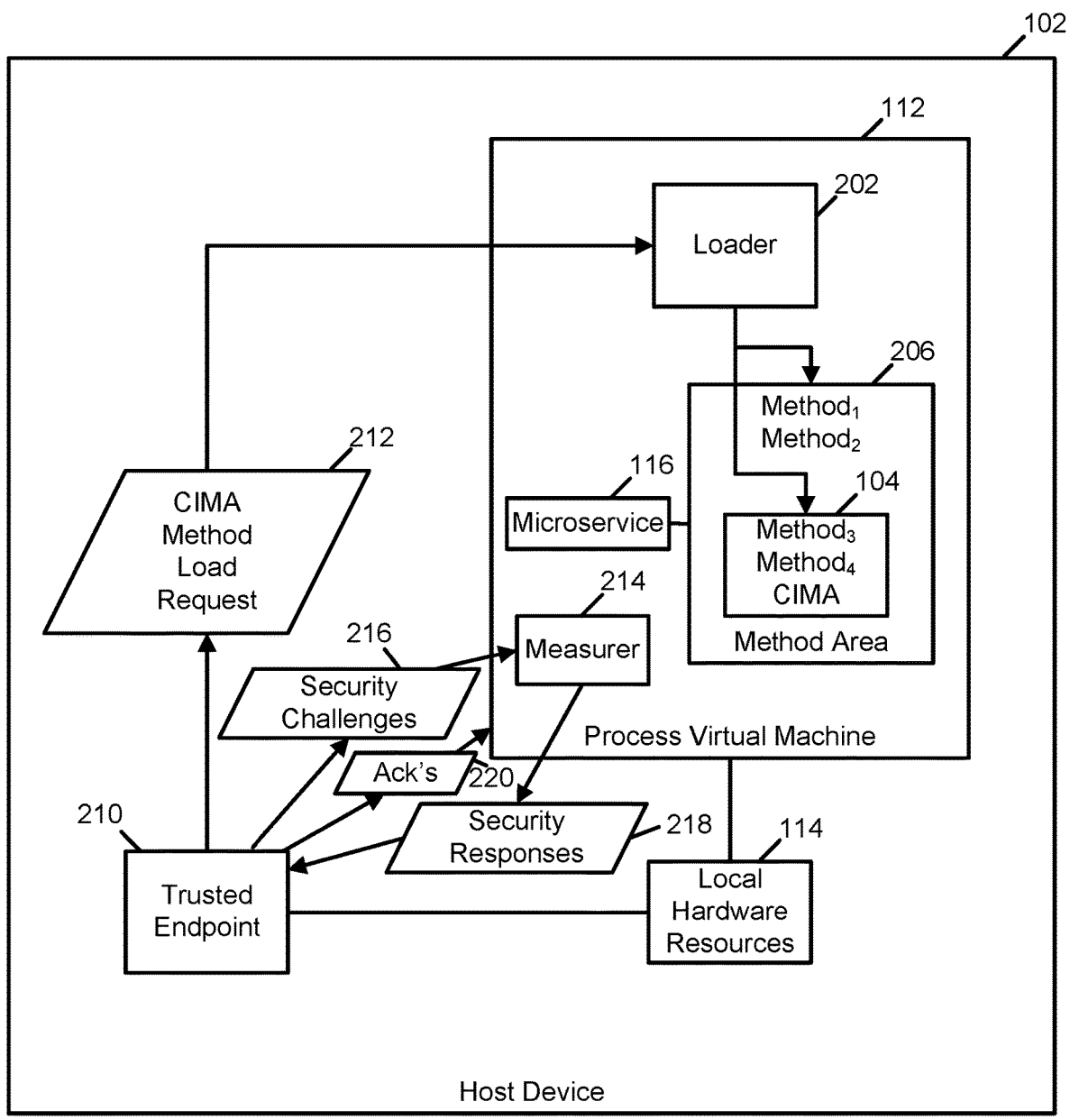
FIG. 2 is a block diagram illustrating various components of the host device of FIG. 1 in accordance with an embodiment of the present disclosure.

FIG. 2 illustrates the host device 102 in greater detail. As shown in FIG. 2, the host device 102 includes the process virtual machine 112, the local hardware resources 114, and a trusted endpoint 210 that is local to the host device 102. The process virtual machine 112 includes a loader 202, a method area 206, and a measurer 214. The method area 206 includes the CIMA 104. The CIMA 104 stores CIMA methods (e.g., Method$_3$ and Method$_4$). The method area 206 stores conventional methods (e.g., Method$_1$ and Method$_2$). One or more of these methods may be implemented and/or called by the microservice 116 or other microservices/programs.

In some embodiments illustrated by FIG. 2, the local hardware resources 114 implement both the process virtual machine 112 and the trusted endpoint 210. For instance, the process virtual machine 112 and the trusted endpoint 210 can implemented by shared components (e.g., one or more processors) of the local hardware resources. In other embodiments, the trusted endpoint 210 can be implemented using components of the local hardware resources that are secured and/or dedicated to the trusted endpoint 210. Similarly, the process virtual machine 112 and the trusted endpoint 210 can each be implemented as one or more processes executing under the control of a single operating system or can each be implemented as one or more processes executing under the control of distinct operating systems. In these embodiments and other embodiments where the trusted endpoint and the process virtual machine are both implemented within a single computing device, the trusted endpoint 210 may communicate (e.g., via CIMA method load requests, security challenges, and acknowledgements) with the process virtual machine 112 using a connection that is local to the host device 102 (i.e., a connection that does not traverse a network, such as the network 110). In some embodiments, the trusted endpoint 210 is configured to be a local resource broker that orchestrates workflows implemented by several microservices executing within the process virtual machine 112.

In some embodiments, the trusted endpoint 210 is configured to maintain currency of microservices resident on the host device 102. For example, in these embodiments, the trusted endpoint 210 can establish trusted communication sessions with the process virtual machine 112 and maintain currency of the microservice 116 within these trusted communication sessions. When executing according to this configuration in the embodiment illustrated in FIG. 2, to establish a trusted communication session, the trusted endpoint 210 generates and transmits the security challenge 216 to the measurer 214. The measurer 214 is configured to receive and parse the security challenge and, in response, generate and transmit the security response 218 to the trusted endpoint 210. The security response 218 may include attestation data descriptive of the constitution of one or more components of the process virtual machine 112. This attestation data may include, for example, one or more hash values calculated for the loader 202. The trusted endpoint 210 receives and processes the security response 218. Where the trusted endpoint 210 matches the attestation data with reference data generated by the trusted endpoint 210, the trusted endpoint 210 transmits an acknowledgement 220 to the process virtual machine 112, thereby establishing a trusted communication session.

In some embodiments, the trusted endpoint 210 is configured to generate and transmit, within the trusted communication session, a microservice update request that includes a CIMA method load request 212. Additionally or alternatively, in some embodiments the trusted endpoint 210 is configured to generate and transmit, within the trusted communication session, the CIMA method load request 212 independently from any microservice update request. The CIMA method load request 212 may include, for example, at least a portion of the microservice 116 (e.g., Method$_3$ and/or Method$_4$) or another CIMA method encoded as intermediate code, may include differences between a previous version of a portion of the microservice or CIMA method and a new version of the microservice or CIMA method, and/or may include other information that specifies an updated version of the microservice, methods included within or used by the microservice and/or another CIMA method.

In some embodiments, the loader 202 is configured to manage retrieval and storage of intermediate code prior to its execution by the process virtual machine 112. When executing according to this configuration in some embodiments illustrated by FIG. 2, the loader 202 retrieves intermediate code from a data storage device included within the local hardware resources 114 and stores the intermediate code within either the CIMA 104 or the method area 206. The loader 202 reserves the CIMA 104 for storage of intermediate code (e.g., Method$_3$ and/or Method$_4$) that provides computing platform services. The loader 202 stores other intermediate code (e.g., Method$_1$ and Method$_2$) to be executed by the process virtual machine 112 in the method area 206.

In some embodiments, the loader 202 is configured to receive, process, and respond to security challenges generated by trusted endpoints, such as the remote resource broker 106 and/or the local trusted endpoint 210. In other embodiments, the loader 202 is configured to receive, process, and response to microservice update requests that may or may not include CIMA method load requests, such as the CIMA method load request 212. Examples of actions executed by the loader 202 under these configurations are described further below with reference to FIGS. 4 and 5.

Program Build Pipeline

Figure 3:
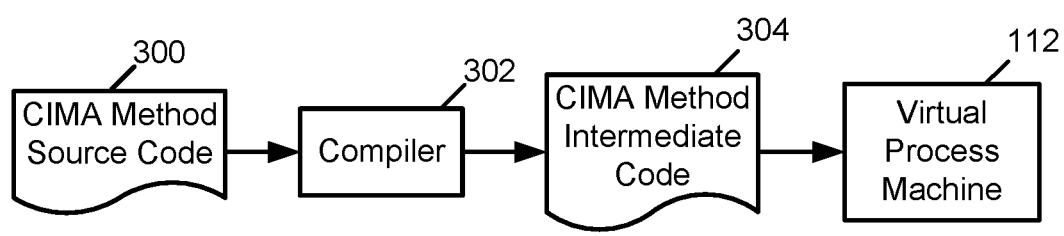
FIG. 3 is a block diagram illustrating a program build pipeline in accordance with an embodiment of the present disclosure.

FIG. 3 illustrates an example of a program build pipeline in accordance with various embodiments disclosed herein. As shown, FIG. 3 includes CIMA method source code 300, a compiler 302, CIMA method intermediate code 304, and the process virtual machine 112. The CIMA method source code 300 may be written in any of a variety of human readable languages, such as Java. One example of a CIMA method declaration in human readable source code follows.

```
# software-definable
public static void writeFlashData(file fileName,
    byte[ ] src,
    int srcOff,
    int srcLen)
        throws UtilException;
```

As illustrated by this CIMA method declaration, in some embodiments, an annotation (e.g., "software-definable") can be used to identify a method (writeFlashData( )) as a CIMA method. In other embodiments, a CIMA method may be similarly identified using a keyword (e.g., "software-definable"). Although these particular source code language constructs are provided as examples, the embodiments disclosed herein are not limited to any particular source code language construct.

In some embodiments, the compiler 302 includes a process virtual machine compiler that is configured to identify and process any of one or more language constructs used to identify CIMA methods. Upon receipt of a command to compile the CIMA method source code 300, the compiler 302 compiles the CIMA method source code 300 to generate the CIMA method intermediate code 304. As part of this compilation process, the compiler 302 identifies any declared CIMA methods and generates intermediate code within the CIMA method intermediate code 304 that is configured to cause a loader of the process virtual machine (e.g., the loader 202) to store the intermediate code in a CIMA (e.g., the CIMA 104). In this way, the CIMA method intermediate code 304 is identified as being controllable and upgradable by a trusted endpoint (e.g., the remote resource broker 106 or the trusted endpoint 210). The CIMA method intermediate code 304 is then provided to the process virtual machine 112 (e.g. via the loader 202) for storage and execution.

Methodology

Figure 4:
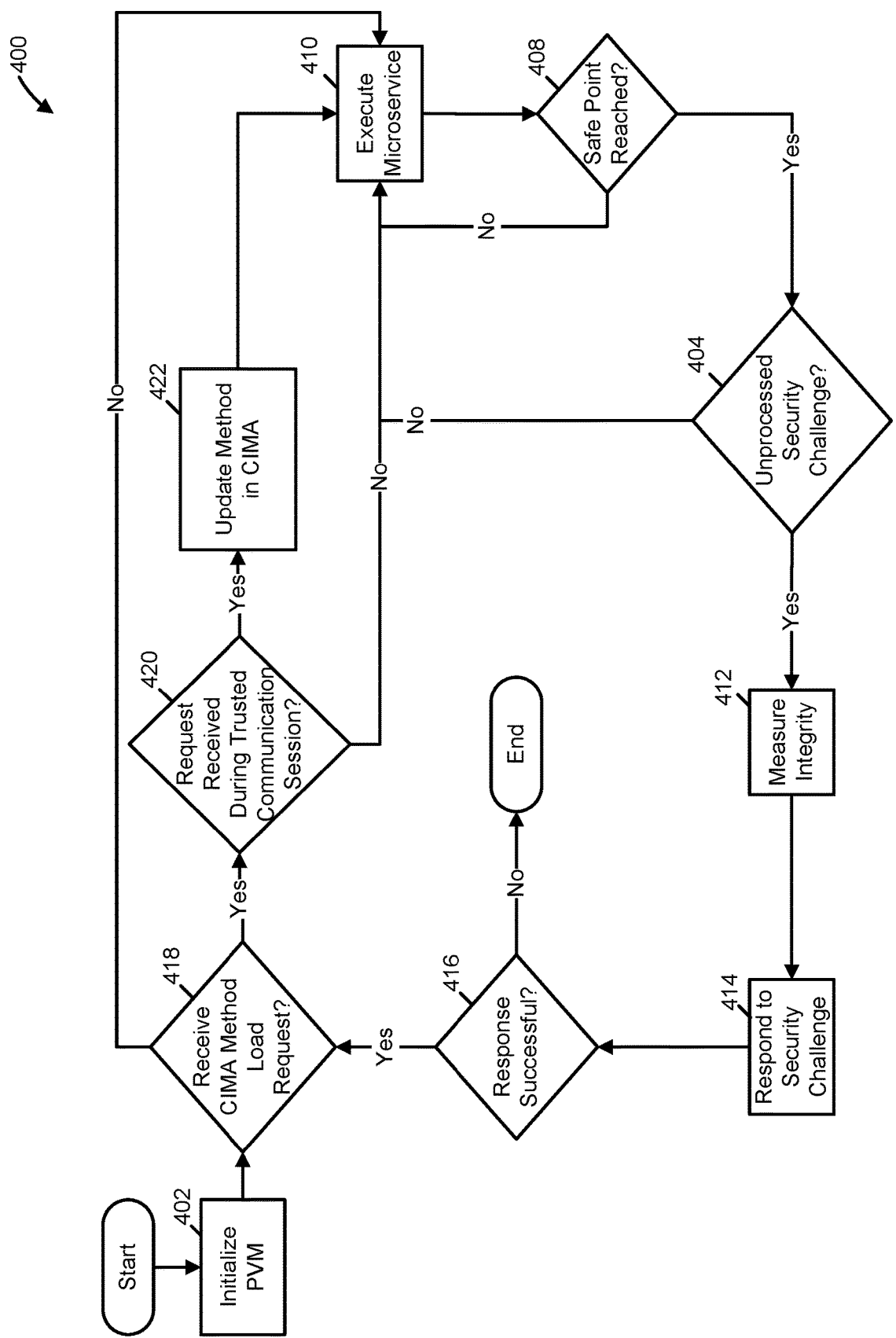
FIG. 4 is a flow chart illustrating a method of providing a microservice infrastructure in accordance with an embodiment of the present disclosure.

According to some embodiments, a microservice infrastructure implemented within a computing system, such as the distributed computing system 100, executes processes that securely deploy computing platform microservices and/or CIMA methods to host devices. FIG. 4 illustrates a CIMA maintenance process 400 in accord with these embodiments. As shown in FIG. 4, the CIMA maintenance process 400 includes several acts that collectively enable a host device, such as the host device 102, to establish a trusted communication session with a trusted endpoint, to receive updates to one or more CIMA methods within the trusted communication session, to deploy these updates, and to execute one or more microservices within a process virtual machine that implement and/or interoperate with the CIMA methods.

As illustrated in FIG. 4, the CIMA maintenance process 400 starts in act 402 with the host device initializing a process virtual machine, such as the process virtual machine 112. In some embodiments, the actions executed by the host device in the act 402 include instantiating a loader, such as the loader 202; allocating a CIMA, such as the CIMA 104; and allocating a method area, such as the method area 206. The actions executed by the host device in the act 402 can further include loading, via the loader, one or more methods, such as the Method$_1$ and/or the Method$_2$ described above with reference to FIG. 2 into the method area; loading, via the loader, one or more CIMA methods, such as the Method$_3$ and/or the Method$_4$ into the CIMA; loading, via the loader, properties and other components of the microservice 116; and executing the microservice 116 and/or its components.

In the act 418, the process virtual machine determines whether a microservice update request including a CIMA method load request, such as the CIMA method load request 212, has been received from a trusted endpoint, such as the remote resource broker 106 or the trusted endpoint 210. In act 420, the process virtual machine determines whether the microservice update request was received during a trusted communication session. For instance, the process virtual machine may compare the time of receipt of the microservice update request to the time of the most recently successful security response. Where the microservice update request was received during a trusted communication session (e.g., where the time of receipt of the microservice update request is within a pre-determined range of the time of the most recently successful security response), the process virtual machine executes act 422. Where the microservice update request was not received during a trusted communication session (e.g., where the time of receipt of the microservice update request is not within a pre-determined range of the time of the most recently receive successful security response), the process virtual machine executes the microservice and/or its components, in act 410.

In the act 422, the process virtual machine deploys a CIMA method included in the CIMA method load request to the CIMA within the host device. In deploying the CIMA method, the process virtual machine (e.g., via the loader) stores intermediate code included and/or represented in the CIMA method load request in the CIMA. This deployment activity may include copying data, or may include more sophisticated manipulation of the data (e.g., decrypting, decompressing, or the like).

In act 408, the process virtual machine determines whether all of processes executing within the process virtual machine have reached a safe point. If not, the process virtual machine continues execution of the microservices in act 410. If all of the processes have reached a safe point, the process virtual machine executes act 404. In the act 404, the process virtual machine determines whether a security challenge, such as the security challenge 216, has been received from the trusted endpoint. If so, the process virtual machine executes act 412. Otherwise, the process virtual machine executes the act 410.

In the act 412, the process virtual machine measures, e.g., by executing the measurer 214, the integrity of various components of the host device to generate attestation data descriptive of the constitution of the components. The components for which attestation data is generated may include, for example, components of the process virtual machine itself, such as the loader, the application logic, the microservices, and any drivers or other components used by the process virtual machine to communicate with hardware components local to the host device, such as the local hardware resources 114. In act 414, the process virtual machine transmits a response, such as the security response 218, to the security challenge. This response may include the attestation data generated in the act 412.

In act 416, the process virtual machine determines whether the response was successful. For example, the process virtual machine may make this determine based on whether a positive acknowledgement, such as the acknowledgement 220, is received from the trusted endpoint within a predetermined period of time. If so, a trusted communication session is established, and the process virtual machine proceeds to act 418. In some embodiments, within the act 416, the process virtual machine stores a timestamp that indicates when the trusted communication session was established. If the response was not successful (e.g., if the positive acknowledgement is not received within the predetermine time period), no trusted communication session is established, and the process virtual machine terminates the CIMA maintenance process 400, and, in some embodiments, terminates all processes, including itself, as an additional security measure.

Each of the processes disclosed herein depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein.

Flash Memory Microservice Example

Figure 5:
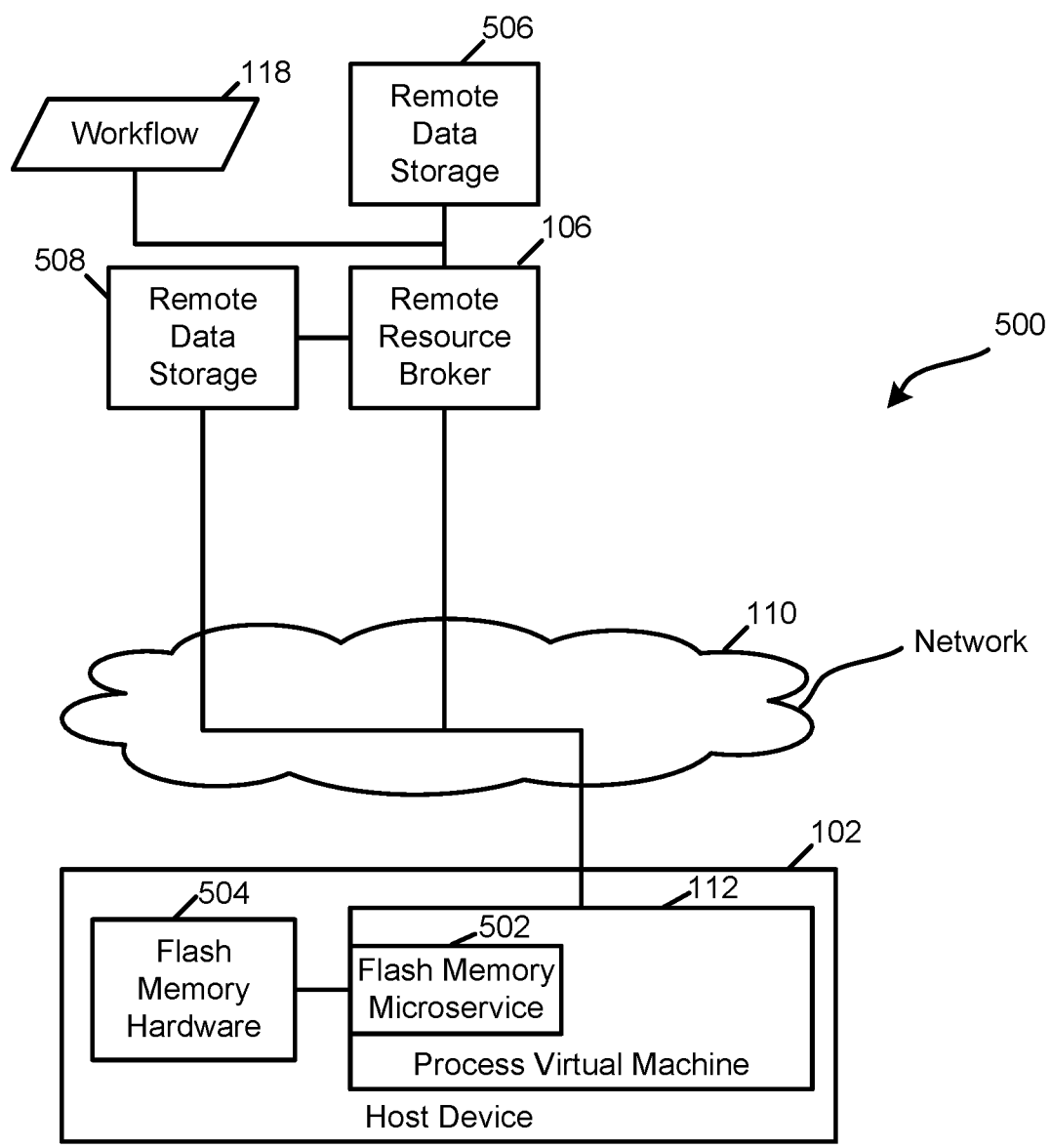
FIG. 5 is a block diagram illustrating an example of a microservice infrastructure including a particular microservice in accordance with an embodiment of the present disclosure.

FIG. 5 illustrates a distributed computing system 500 implementing a microservice infrastructure in accordance with at least one embodiment. As shown, the computing system 500 includes the host device 102, the remote resource broker 106, remote data storage 506, remote data storage 508, workflow 118, and the communication network 110. As shown in FIG. 5, the remote data storage 506 and the remote data storage 508 are implemented using one or more computing devices, such as the computing device described further below with reference to FIG. 6. In these embodiments, the remote data storage 506 and the remote data storage 508 are configured to exchange information via the network 110.

As illustrated in FIG. 5, the host device 102 includes local flash memory hardware 504. As shown, the process virtual machine 112 implements and/or controls a flash memory microservice 502. In some embodiments, the flash memory microservice 502 is a program executable by the process virtual machine 112 to provide other programs executed according to the workflow 118 with access to flash memory storage. In processing the requests to store data in flash memory, the flash memory microservice 502 may access and utilize the local flash memory 504, transmit requests to the remote resource broker 106 to provision and/or utilize the remote data storage 506 or the remote data storage 508.

For example, in some embodiments, the flash memory microservice 502 is configured to process requests to store data by storing the data in the flash memory 504 and in the remote data storage 506. In one example in accord with these embodiments, if the remote data storage 506 becomes unavailable or compromised, the remote resource broker 106 can transmit a microservice update request including a CIMA method load request to the host device 102. The CIMA method load request can include intermediate code that, when deployed, causes the flash memory microservice 502 to process requests to store data by storing the data in the remote data storage 508.

Computing Device

Figure 6:
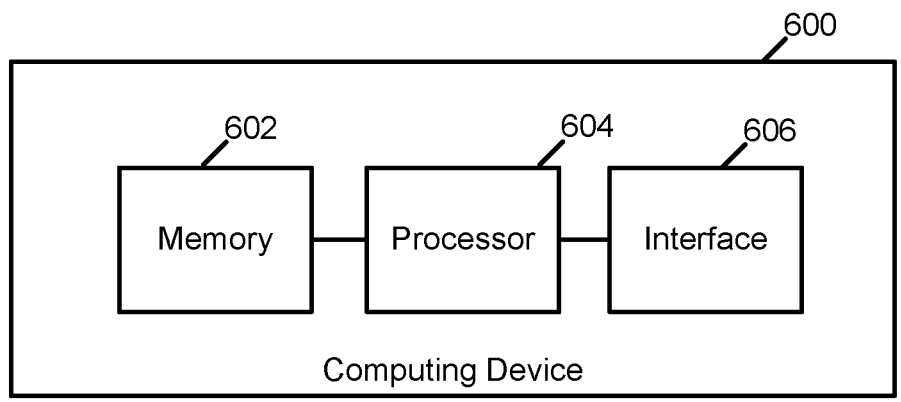
FIG. 6 is a block diagram of a computing device that may be used to implement various components of a microservice infrastructure in accordance with an embodiment of the present disclosure.

FIG. 6 illustrates a computing device 600 that can be used to implement various components of a microservice infrastructure as described herein. As shown, the computing device 600 includes memory 602, at least one processor 604, and at least one interface 606. Although the particular types and models of these components may vary between computing devices, it is appreciated that each computing device includes a processor, memory, and an interface.

The interface 606 includes one or more physical interface devices such as input devices, output devices, and combination input/output devices and a software stack configured to drive operation of the devices. Interface devices may receive input or provide output. More particularly, output devices may render information for external presentation and input devices may accept or generate information from external sources. Examples of interface devices include keyboards, mouse devices, trackballs, microphones, touch screens, printing devices, display screens, speakers, network interface cards, environmental sensors, and the like. Interface devices allow programmable devices to exchange information and communicate with external entities, such as users and other systems.

The memory 602 includes volatile and/or non-volatile (non-transient) data storage that is readable and/or writeable by the processor 602. The memory 602 stores programs and data used or manipulated during operation of the computing device 600. The programs stored in the memory 602 are a series of instructions that are executable by the at least one processor 602. The memory 602 may include relatively high performance data storage, such as registers, caches, dynamic random access memory, and static memory. The memory 602 may further include a relatively low performance, non-volatile, computer readable and/or writable data storage medium such as flash memory or an optical or magnetic disk. Various embodiments may organize the memory 602 into particularized and, in some cases, unique structures to store data in support of the components disclosed herein. These data structures may be specifically configured to conserve storage space or increase data exchange performance and may be sized and organized to store values for particular data and types of data.

To implement and/or control specialized components in some embodiments, the processor 604 executes a series of instructions (i.e., one or more programs) that result in manipulated data. The processor 604 may be any type of processor, multiprocessor, microprocessor, or controller known in the art. The processor 604 is connected to and communicates data with the memory 602 and the interfaces 606 via an interconnection mechanism, such as a bus or some other data connection. This interconnection mechanism is represented in FIG. 6 by lines connecting the components within the computing device. In operation, the processor 604 causes data to be read from a non-volatile (i.e., non-transitory) data storage medium in the memory 602 and written to high performance data storage. The processor 604 manipulates the data within the high-performance data storage and copies the manipulated data to the data storage medium after processing is completed.

Although the computing device 600 is shown as an example of a computing device capable of executing the processes disclosed herein, embodiments are not limited to the computing device shown in FIG. 6. For example, various processes may be executed by one or more computing devices having a different architectures or components than those shown in FIG. 6. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a computing device as disclosed herein may be implemented in software, hardware, firmware, or any combination thereof.

For example, as described above with reference to FIG. 1, in some embodiments the process virtual machine 112 is implemented in hardware. In other embodiments, the process virtual machine 112 is implemented by the processor 604. As described above, this processor 604 may be general purpose processor. However, when executing a specific software process as described herein (e.g., as depicted in any of FIGS. 3-5), the processor 604 becomes a special purpose processor capable of making specific logic-based determinations based on input data received, and further capable of providing one or more outputs that can be used to control or otherwise inform subsequent processing to be carried out by the processor 604 and/or other processors or circuitry with which processor 604 is communicatively coupled. The processor 604 reacts to specific input stimulus in a specific way and generates a corresponding output based on that input stimulus. In this sense, the structure of processor 604 according to one embodiment is defined by the processes shown in any of FIGS. 3-5. Moreover, in some example cases, the processor 604 proceeds through a sequence of logical transitions in which various internal register states and/or other bit cell states internal or external to the processor 604 may be set to logic high or logic low. This specific sequence of logic transitions is determined by the state of electrical input signals to the processor 604 and a special-purpose structure is effectively assumed by the processor 604 when executing each software instruction of the processes shown in FIGS. 3-5. Specifically, those instructions anticipate the various stimulus to be received and change the implicated memory states accordingly. In this way, the processor 604 may generate and store or otherwise provide useful output signals. Thus, it is appreciated that the processor 604, during execution of a software process becomes a special purpose machine, capable of processing only specific input signals and rendering specific output signals based on the one or more logic operations performed during execution of each instruction. In at least some examples, the processor 604 is configured to execute a function where software is stored in a data storage device coupled with the processor 604 (e.g., the memory 602) and that software is configured to cause the processor 604 to proceed through a sequence of various logic operations that result in the function being executed.

Further Example Embodiments

The following examples pertain to further embodiments, from which numerous permutations and configurations will be apparent.

Example 1 is a computing device comprising a memory, at least one processor coupled to the memory, and a process virtual machine executable by the at least one processor. The process virtual machine is configured to initialize, within the memory, at least one controlled immutable method area (CIMA); load a CIMA method into the at least one CIMA; receive a first request to update the CIMA method; determine whether the first request was received from a trusted endpoint; and abort processing of the first request in response to determining that the first request was received from an endpoint other than the trusted endpoint.

Example 2 includes the subject matter of Example 1, wherein the process virtual machine is further configured to receive a second request to update the CIMA method, the second request specifying an updated version of the CIMA method; determine whether the second request was received from the trusted endpoint; and load the updated version of the CIMA method into the at least one CIMA in response to determining that the second request was received from the trusted endpoint.

Example 3 includes the subject matter of Example 1 or Example 2, wherein the process virtual machine is further configured to receive a challenge from the trusted endpoint; respond to the challenge; receive a positive acknowledgement; and continue execution in response to receiving the positive acknowledgement.

Example 4 includes the subject matter of Example 3, wherein the process virtual machine is configured to respond to the challenge at least in part by generating attestation data comprising a measurement of integrity of one or more components of the process virtual machine.

Example 5 includes the subject matter of Example 3 or Example 4, wherein the process virtual machine is further configured to establish, in response to receiving the positive acknowledgment, a trusted communication session with the trusted endpoint; and receive the second request from the trusted endpoint within the trusted communication session.

Example 6 includes the subject matter of any of Examples 1-5, wherein the process virtual machine is further configured to receive a challenge from the trusted endpoint; respond to the challenge; fail to receive a positive acknowledgement within a predetermined period of time; and terminate execution of the process virtual machine in response to failing to receive the positive acknowledgement within the predetermined period of time.

Example 7 includes the subject matter of any of Examples 3-6, wherein the process virtual machine is further configured to respond to the challenge at a safe point.

Example 8 includes the subject matter of any of Examples 1-7, wherein the process virtual machine is a java virtual machine.

Example 9 includes the subject matter of any of Examples 1-8, wherein the process virtual machine is a hardware component.

Example 10 includes the subject matter of any of Examples 1-9, further comprising the trusted endpoint.

Example 11 includes the subject matter of any of Examples 1-10, wherein the CIMA method is comprised within one or more microservice classes that implement one or more computing platform services.

Example 12 includes the subject matter of any of Examples 1-11, wherein the at least one CIMA comprises a plurality of distinct method areas.

Example 13 includes the subject matter of any of Examples 1-12, further comprising a compiler executable by the at least one processor and configured to receive source code defining the CIMA method, the source code comprising a language construct that identifies the CIMA method as being software-definable; compile the source code into intermediate code defining the CIMA method, the intermediate code being executable by the process virtual machine; and store the intermediate code at a location in the memory accessible by the process virtual machine.

Example 14 is a method of managing one or more controlled immutable method area (CIMA) methods executable by a process virtual machine. The method comprises initializing, within memory under control of the process virtual machine, at least one CIMA; loading a CIMA method into the at least one CIMA; receiving a first request to update the CIMA method; determining whether the first request was received from a trusted endpoint; and aborting processing of the first request in response to determining that the first request was received from an endpoint other than the trusted endpoint.

Example 15 includes the subject matter of Example 14, further comprising receiving a second request to update the CIMA method, the second request specifying an updated version of the CIMA method; determining whether the second request was received from the trusted endpoint; and loading the updated version of the CIMA method into the at least one CIMA in response to determining that the second request was received from the trusted endpoint.

Example 16 includes the subject matter of Examples 14 or Example 15, further comprising receiving a challenge from the trusted endpoint; responding to the challenge; receiving a positive acknowledgement; and continuing execution in response to receiving the positive acknowledgement.

Example 17 includes the subject matter of Example 16, wherein responding to the challenge comprises generating attestation data comprising a measurement of integrity of one or more components of the process virtual machine.

Example 18 includes the subject matter of Example 16 or Example 17, further comprising: establishing, in response to receiving the positive acknowledgment, a trusted communication session with the trusted endpoint; and receiving the second request from the trusted endpoint within the trusted communication session.

Example 19 includes the subject matter of any of Examples 14-18, further comprising receiving a challenge from the trusted endpoint; responding to the challenge; failing to receive a positive acknowledgement within a predetermined period of time; and terminating execution of the process virtual machine in response to failing to receive the positive acknowledgement within the predetermined period of time.

Example 20 includes the subject matter of any of Examples 16-19, wherein responding to the challenge includes responding to the challenge at a safe point.

Example 21 includes the subject matter of any of Examples 14-20, further comprising initializing the process virtual machine, the process virtual machine being a java virtual machine.

Example 22 includes the subject matter of Example 21, wherein initializing the process virtual machine comprises initializing a java virtual machine implemented in hardware.

Example 23 includes the subject matter of any of Examples 14-22, wherein the process virtual machine and the trusted endpoint are implemented within a single computing device, the method further comprises transmitting the first request via a connection local to the single computing device, and receiving the first request comprises receiving the first request via the connection.

Example 24 includes the subject matter of any of Examples 14-23, wherein loading the CIMA method comprises loading a CIMA method defined within at least one microservice class that implements at least one computing platform service.

Example 25 includes the subject matter of any of Examples 14-24, wherein initializing the at least one CIMA comprises initializing a plurality of distinct method areas.

Example 26 includes the subject matter of any of Examples 14-25, further comprising receiving source code defining the CIMA method, the source code comprising a language construct that identifies the CIMA method as being software-definable; compiling the source code into intermediate code defining the CIMA method, the intermediate code being executable by the process virtual machine; and storing the intermediate code at a location in the memory accessible by the process virtual machine.

Example 27 is a non-transient computer readable medium encoded with instructions that when executed by one or more processors cause a process for managing one or more controlled immutable method area (CIMA) methods to be carried out. The process comprises initializing, within memory under control of a process virtual machine, at least one CIMA; loading a CIMA method into the at least one CIMA; receiving a first request to update the CIMA method; determining whether the first request was received from a trusted endpoint; and aborting processing of the first request in response to determining that the first request was received from an endpoint other than the trusted endpoint.

Example 28 includes the subject matter of Example 27, wherein the process further comprises receiving a second request to update the CIMA method, the second request specifying an updated version of the CIMA method; determining whether the second request was received from the trusted endpoint; and loading the updated version of the CIMA method into the at least one CIMA in response to determining that the second request was received from the trusted endpoint.

Example 29 includes the subject matter of Example 27 or Example 28, wherein the process further comprises receiving a challenge from the trusted endpoint; responding to the challenge; receiving a positive acknowledgement; and continuing execution in response to receiving the positive acknowledgement.

Example 30 includes the subject matter of Example 29, wherein, in the process, responding to the challenge comprises generating attestation data comprising a measurement of integrity of one or more components of the process virtual machine.

Example 31 includes the subject matter of Example 29 or Example 30, wherein the process further comprises establishing, in response to receiving the positive acknowledgment, a trusted communication session with the trusted endpoint; and receiving the second request from the trusted endpoint within the trusted communication session.

Example 32 includes the subject matter of any of Examples 27-31, wherein the process further comprises receiving a challenge from the trusted endpoint; responding to the challenge; failing to receive a positive acknowledgement within a predetermined period of time; and terminating execution of the process virtual machine in response to failing to receive the positive acknowledgement within the predetermined period of time.

Example 33 includes the subject matter of any of Examples 29-32, wherein, in the process, responding to the challenge includes responding to the challenge at a safe point.

Example 34 includes the subject matter of any of Examples 27-33, wherein the process further comprises initializing the process virtual machine, the process virtual machine being a java virtual machine.

Example 35 includes the subject matter of Example 34, wherein, in the process, initializing the process virtual machine comprises initializing a java virtual machine implemented in hardware.

Example 36 includes the subject matter of any of Examples 27-35, wherein the process virtual machine and the trusted endpoint are implemented within a single computing device, the process further comprises transmitting the first request via a connection local to the single computing device, and receiving the first request comprises receiving the first request via the connection.

Example 37 includes the subject matter of any of Examples 27-36, wherein, in the process, loading the CIMA method comprises loading a CIMA method defined within at least one microservice class that implements at least one computing platform service.

Example 38 includes the subject matter of any of Examples 27-37, wherein, in the process, initializing the at least one CIMA comprises initializing a plurality of distinct method areas.

Example 39 includes the subject matter of any of Examples 27-38, wherein the process further comprises receiving source code defining the CIMA method, the source code comprising a language construct that identifies the CIMA method as being software-definable; compiling the source code into intermediate code defining the CIMA method, the intermediate code being executable by the process virtual machine; and storing the intermediate code at a location in the memory accessible by the process virtual machine.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A computing device comprising:
a memory;
at least one processor coupled to the memory; and
a process virtual machine executable by the at least one processor and configured to:
initialize, within the memory, at least one controlled immutable method area (CIMA);
load a first method into the at least one CIMA, the first method being a CIMA method;
load a second method into the memory outside the at least one CIMA;
execute a microservice configured to call the second method and the CIMA method;
receive a first request to update the CIMA method;
determine whether the first request was received from a trusted endpoint;
abort processing of the first request in response to determining that the first request was received from an endpoint other than the trusted endpoint;
receive a second request to update the CIMA method, the second request specifying an updated version of the CIMA method;
determine whether the second request was received from the trusted endpoint; and
load the updated version of the CIMA method into the at least one CIMA in response to determining that the second request was received from the trusted endpoint.

2. The computing device of claim 1, wherein the process virtual machine is further configured to:
receive a challenge from the trusted endpoint;
respond to the challenge;
receive a positive acknowledgement; and
continue execution in response to receiving the positive acknowledgement.

3. The computing device of claim 1, wherein the process virtual machine is a java virtual machine.

4. The computing device of claim 1, wherein the process virtual machine is a hardware component.

5. The computing device of claim 1, further comprising the trusted endpoint.

6. The computing device of claim 1, wherein the CIMA method is comprised within one or more microservice classes that implement one or more computing platform services.

7. The computing device of claim 1, wherein the at least one CIMA comprises a plurality of distinct method areas.

8. The computing device of claim 1, further comprising a compiler executable by the at least one processor and configured to:
receive source code defining the CIMA method, the source code comprising a language construct that identifies the CIMA method as being software-definable;
compile the source code into intermediate code defining the CIMA method, the intermediate code being executable by the process virtual machine; and
store the intermediate code at a location in the memory accessible by the process virtual machine.

9. A method of managing one or more controlled immutable method area (CIMA) methods executable by a process virtual machine, the method comprising:
initializing, within memory under control of the process virtual machine, at least one CIMA;
loading a first method into the at least one CIMA, the first method being a CIMA method;
loading a second method into the memory outside the at least one CIMA;
executing a microservice configured to call the second method and the CIMA method;
receiving a first request to update the CIMA method;
determining whether the first request was received from a trusted endpoint;
aborting processing of the first request in response to determining that the first request was received from an endpoint other than the trusted endpoint; and
receiving a second request to update the CIMA method, the second request specifying an updated version of the CIMA method;
determining whether the second request was received from the trusted endpoint; and
loading the updated version of the CIMA method into the at least one CIMA in response to determining that the second request was received from the trusted endpoint.

10. The method of claim 9, further comprising initializing the process virtual machine, the process virtual machine being a java virtual machine.

11. The method of claim 10, wherein initializing the process virtual machine comprises initializing a java virtual machine implemented in hardware.

12. The method of claim 9, wherein the process virtual machine and the trusted endpoint are implemented within a single computing device, the method further comprises transmitting the first request via a connection local to the single computing device, and receiving the first request comprises receiving the first request via the connection.

13. The method of claim 9, wherein loading the CIMA method comprises loading a CIMA method defined within at least one microservice class that implements at least one computing platform service.

14. The method of claim 9, wherein initializing the at least one CIMA comprises initializing a plurality of distinct method areas.

15. The method of claim 9, further comprising:
receiving source code defining the CIMA method, the source code comprising a language construct that identifies the CIMA method as being software-definable;
compiling the source code into intermediate code defining the CIMA method, the intermediate code being executable by the process virtual machine; and
storing the intermediate code at a location in the memory accessible by the process virtual machine.

16. A non-transient computer readable medium encoded with instructions that when executed by one or more processors cause a process for managing one or more controlled immutable method area (CIMA) methods to be carried out, the process comprising:
initializing, within memory under control of a process virtual machine, at least one CIMA;
loading a first method into the at least one CIMA, the first method being a CIMA method;
loading a second method into the memory outside the at least one CIMA;
executing a microservice configured to call the second method and the CIMA method;
receiving a first request to update the CIMA method;
determining whether the first request was received from a trusted endpoint;
aborting processing of the first request in response to determining that the first request was received from an endpoint other than the trusted endpoint;

receiving a second request to update the CIMA method, the second request specifying an updated version of the CIMA method;

determining whether the second request was received from the trusted endpoint; and loading the updated version of the CIMA method into the at least one CIMA in response to determining that the second request was received from the trusted endpoint.

17. The computer readable medium of claim 16, wherein the process further comprises initializing the process virtual machine, the process virtual machine being a java virtual machine.

18. The computer readable medium of claim 17, wherein, in the process, initializing the process virtual machine comprises initializing a java virtual machine implemented in hardware.

19. The computer readable medium of claim 16, wherein the process virtual machine and the trusted endpoint are implemented within a single computing device, the process further comprises transmitting the first request via a connection local to the single computing device, and receiving the first request comprises receiving the first request via the connection.

20. The computer readable medium of claim 16, wherein, in the process, loading the CIMA method comprises loading a CIMA method defined within at least one microservice class that implements at least one computing platform service.

21. The computer readable medium of claim 16, wherein, in the process, initializing the at least one CIMA comprises initializing a plurality of distinct method areas.

22. The computer readable medium of claim 16, wherein the process further comprises:

receiving source code defining the CIMA method, the source code comprising a language construct that identifies the CIMA method as being software-definable;

compiling the source code into intermediate code defining the CIMA method, the intermediate code being executable by the process virtual machine; and storing the intermediate code at a location in the memory accessible by the process virtual machine.

\* \* \* \* \*